Oct. 23, 1956  D. I. DOYLE  2,767,904
MOTOR FOR VACUUM PRODUCING MACHINES
Filed March 23, 1953  2 Sheets-Sheet 1

INVENTOR:
DEWEY I. DOYLE
BY
Spencer Johnston, Cook & Root.
ATT'YS

United States Patent Office 2,767,904
Patented Oct. 23, 1956

2,767,904

MOTOR FOR VACUUM PRODUCING MACHINES

Dewey I. Doyle, Grand Rapids, Mich., assignor to Doyle Vacuum Cleaner Company, Grand Rapids, Mich., a corporation of Michigan Application March 23, 1953, Serial No. 344,135

2 Claims. (Cl. 230—117)

This invention relates to tank type vacuum cleaners in general, and particularly to the positioning of the motor with respect to the tank body in a tank type vacuum cleaner.

Prior to the present invention it was customary, in mounting the motor at the top of the tank of a tank type vacuum cleaner, to position the commutator and brushes at the upper end of the motor shaft and the fan wheel at the lower end. The lower end of the motor is commonly referred to as the "shaft end," that being the end from which the shaft of the motor protrudes, having mounted thereon the fan wheel that produces the vacuum. The motor cooling fan wheel at the end of the shaft created a suction for the cooling air for the motor, causing air to be drawn inwardly and pushed upwardly past the motor. The cooling air serves to cool the brushes and the commutator. In former motor arrangements, however, the air would become heated by passing over the motor to such a degree that when the air reached the brushes and the commutator at the upper end of the motor its cooling effect was reduced to a minimum.

In the vacuum producing machine disclosed herein the various parts have been reversed so that the commutator and the brushes are on the lower or shaft end of the motor and the motor cooling fan wheel is at the upper or opposed end of the motor. This arrangement has the effect of permitting the cool air to reach the commutator and brushes first before it becomes heated by the motor winding.

The primary object of the present invention is the provision of an improved motor mounting arrangement whereby the motor commutator and brushes are on the shaft end of the motor and the motor cooling fan wheel is at the opposed end of the motor. Such arrangement enables the use of brushes at the lower end of the motor permitting employment of a brush that is larger per cubic inch design volume and consequently prolonging the life of the motor and brushes.

Another object of the invention is the provision of the commutator and brushes on the lower end of the motor thereby to enhance the life of the motor owing to the lesser amount of whip action on the shaft end bearing the commutator and brushes.

A further object of the present invention is the provision of a rearrangement of the motor brushes and the commutator on the shaft end of the motor enabling enhanced cooling of the brushes when air is drawn into and passed through the motor rather than being pushed through the motor.

A still further object of the invention is the provision of a rearrangement of the motor brushes and commutator on the shaft end of the motor, thereby enhancing the cooling of the brushes because of the contact therewith of cooler air entering in the vicinity of the shaft end of the motor and passing over the brushes prior to passing over the balance of the motor with attendant heating of the air.

A further object of the present invention is the provision of the motor brushes at the bottom of the motor whereby lending the structure to better design, of streamlined character, enhancing the appearance of the structure by permitting the use of a shroud or covering for the motor that is substantially frustro-conical in shape, eliminating the employment of a more cylindrical covering as would be required were brushes of comparable size to be positioned at the top of the motor.

A still further object of the invention is the provision of a rearrangement of motor parts facilitating the assembly and disassembly of the motor in permitting the removal of the brushes and the motor shaft from the motor.

Other objects and advantages of the invention will become apparent upon reading the following description taken in conjunction with the accompanying drawings in which.

Figure 1:
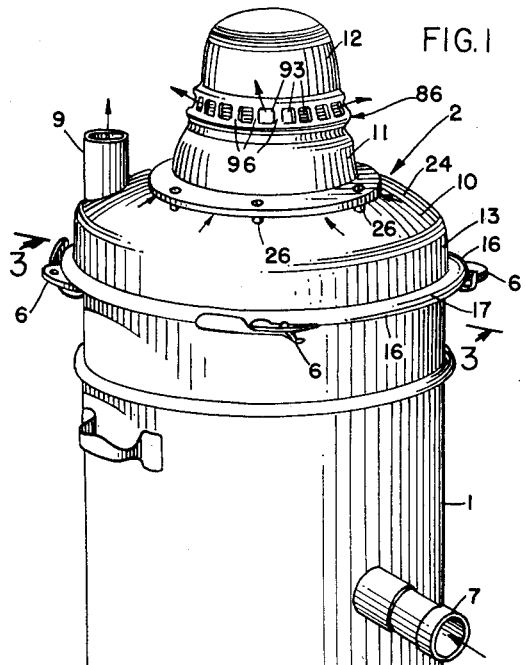
Fig. 1 is a perspective view of a tank type vacuum cleaner embodying the present invention.
Figure 2:
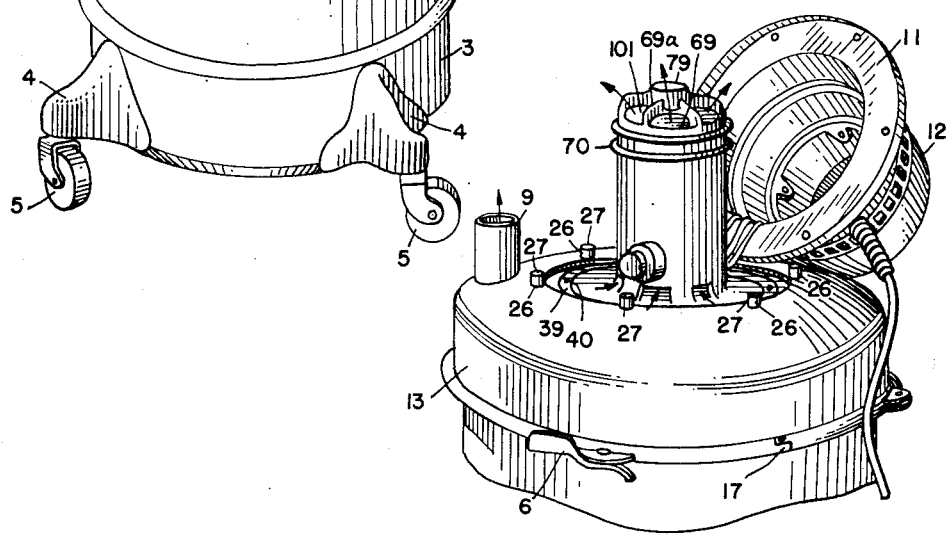
Fig. 2 is a fragmentary perspective view showing the top portion of the vacuum cleaner with the cover removed from the motor.

The machine shown in the figures includes a tank body 1 and a cover 2. The tank body is removably positioned in the caster ring 3 supported by the caster brackets 4 having positioned thereon casters 5. The details of this arrangement are disclosed and claimed in my copending application, Serial No. 344,136 filed March 23, 1953. The cover 2 is removably positioned on the tank body and is retained thereon by means of the clamps 6. Centrally of and extending from a side portion of the tank body 1 is an intake nipple 7 through which air or moisture is taken into the interior 8 (Fig. 3) of the tank body along a course to be described and emanating from the machine via the exit nipple 9.

The cover 2 embodies an assembly which includes a lower portion 10, a medial portion 11 and a cap 12. The lower portion 10 is comprised of an annular downwardly extending flange 13 (Fig. 3) that lies substantially parallel to the plane of the tank body 1 but is of greater circumference than the circumference of the tank body. An inner member 14 is provided with a horizontal flange 14a which is adapted to rest upon the upper end of the body and supports the annular horizontal flange 15 of the lower portion of the cover. A clamping ring 16 has secured thereto the clamps 6 and has an annular groove on the inner surface thereof which receives and clamps together the flanges 14a and 15. The ends of the ring are illustrated herein as being formed into a lap-joint bolted together thereby securely holding together the flanges 14a and 15 as indicated at 17 (Fig. 1), although any other suitable securing means may be used. The inner member 14 also has an inwardly and upwardly curved annular member 18 which terminates in the horizontally disposed flange 19 that defines an annular opening 20. An annular gasket 21 surmounts the flange 19 upon which is positioned the fan wheel housing 22. An annular gasket 23 is mounted along the peripheral edge of the housing 22.

The side portion 13 of the lower portion 10 of the cover 2 is generally rounded as at 24 and terminates in a horizontally disposed rim portion 25 that surmounts the gasket 23. The rounded portion 24 is interrupted at one point by the exit nipple 9 formed integral with the cover portion 10 or butt welded thereto. A series of spacer members 26 are positioned at spaced apart points along the rim 25 of the cover portion, each having an internally threaded opening as at 27.

The vacuum producing fan wheel housing 22 is comprised of a lower plate 28, a plurality of spaced vertical ribs 29 and an overlying flange 30. The lower plate 28 has an annular opening 31 the edge of which is formed by the downwardly turned portion 32. Secured to the lower surface of the plate 28 is a conical shaped screen 33 comprised of a solid circular plate 34 at its apex having baffle members such as 35 radially disposed and secured thereto. The spaced apart vertical ribs 29 define apertures therebetween such as indicated at 36. These apertures 36 function in connection with the vacuum producing fan wheel and form no part of the present invention, such function being explained more fully in my copending application Serial No. 342,521, filed March 16, 1953.

Positioned upon the overlying flange 30 of the vacuum wheel housing 22 is a face plate 37 forming an integral part of the motor housing 38. The plate 37 is upraised at its peripheral portions to define a flange 39 having a series of openings such as 40 aligned with the openings such as 41 in the overlying flange 30 of the vacuum wheel housing 22. The openings 41 are internally threaded, each receiving a bolt such as 42 thereby to secure the plate 37 and motor housing 38 upon the overlying flange 30.

Plate 37 tapers upwardly at its medial portions as at 43 to define a recess for reception of a bearing 44 on the shaft 45 of the motor 46. The lower portion 47 of the motor housing 38 has formed therein a plurality of circumferentially spaced apart air-intake apertures such as 48. The motor housing at the base 47 and at its upper portion 49 is generally cylindrical except for the diametrically opposed brush holder portions 50 and 51 formed integral therewith. Brush holder portions 50 and 51 of the casting have internally threaded bushings 52 and 53 mounted therein to receive respectively the cap screw members 54 and 55 which engage the ends of springs 56 and 57 to maintain the brushes 58 and 59 in contact with the commutator 62. The brushes in conventional manner maintain electrical contact between the stationary and moving parts of the motor, stators 60 and 61 and the commutator 62 of the rotor 63. The electrical connection with the brushes is indicated at 64 and 65.

A cooling fan wheel 67 having conventional blades 68 is positioned adjacent the upper end 66 of shaft 46, or on the end opposite the shaft end of the motor. The end plate or closure 69 of the motor housing 38 is half-lapped at the edge of side portion 70 to form half-lapped joint 71 with respect to the terminus 72 of the upper portion 49 of the motor housing. An annular flange 73 extends inwardly of the closure 69 at a point adjacent the lower edge of the fan wheel 67 and has openings therein to threadedly receive bolts 75 and 76. The flange 73 terminates closely adjacent the lower face of fan wheel 67 and this prevents the air from recirculating within the motor housing 38, thus insuring the passage thereof outwardly through openings 101. The head or lower ends of bolts 75 and 76 pass through openings in the plate 37 of the motor housing and serve to secure the closure 69 to the main portion of the housing. The upper end 66 of the motor shaft is journaled in the ball bearing ring 77 to form the bearing 78 with respect to the top portion 79 of the closure 69. The closure 69 has a plurality of air exit openings 101 circumferentially spaced therearound.

The medial portion 11 of the cover 2 has a downwardly depending flange 80 circumscribing the spacers 26 circumferentially spaced apart upon the upper portion 10 of the cover 2, thereby to define an annular air intake slot 105. Adjacent the flange 80 is a series of openings corresponding in number and location with the internally threaded openings 27 of the spacers 26. Bolts 81 are received by these aligned openings to secure the medial portion 11 of the cover upon the spacers 26. The medial portion 11 of the cover is curved upwardly as at 82 and tapers inwardly as at 83 terminating in a vertically disposed rim 84 that has a plurality of circumferentially spaced openings such as 85 therein. A circular generally inwardly and upwardly sloping casting 86 having at its outer edge a downwardly depending annular leg portion 87 and an outwardly protruding annular rib 88 is seated within and secured to the rim 84 by means of machine bolts such as 85a. The casting 86 has formed thereon an annular seat 89 to receive the cap 12 which is secured at spaced apart points to the annular rib 91 formed adjacent the seat 89 by suitable means such as bolts 92. The upper part of the casting 86 is formed to provide a horizontally disposed annular ledge 94 and an upwardly and inwardly extending annular leg 95. A series of circumferentially spaced ribs 96 (Fig. 1) in the casting 86 define exit slots 93 for the motor cooling air. Secured to the leg 95 by means of machine bolts such as 97 is a cup-shaped or frustro-conical member 98, the inwardly tapering side of which rests at its upper edge portion against the annular rubber gasket 99 circumscribing the side 70 of closure 69. It will be seen that the inner surface of cap 12 and the outer surface of the frustro-conical member 98 define a substantially frustro-conical channel 100 for the passage of air from the motor.

Figure 3:
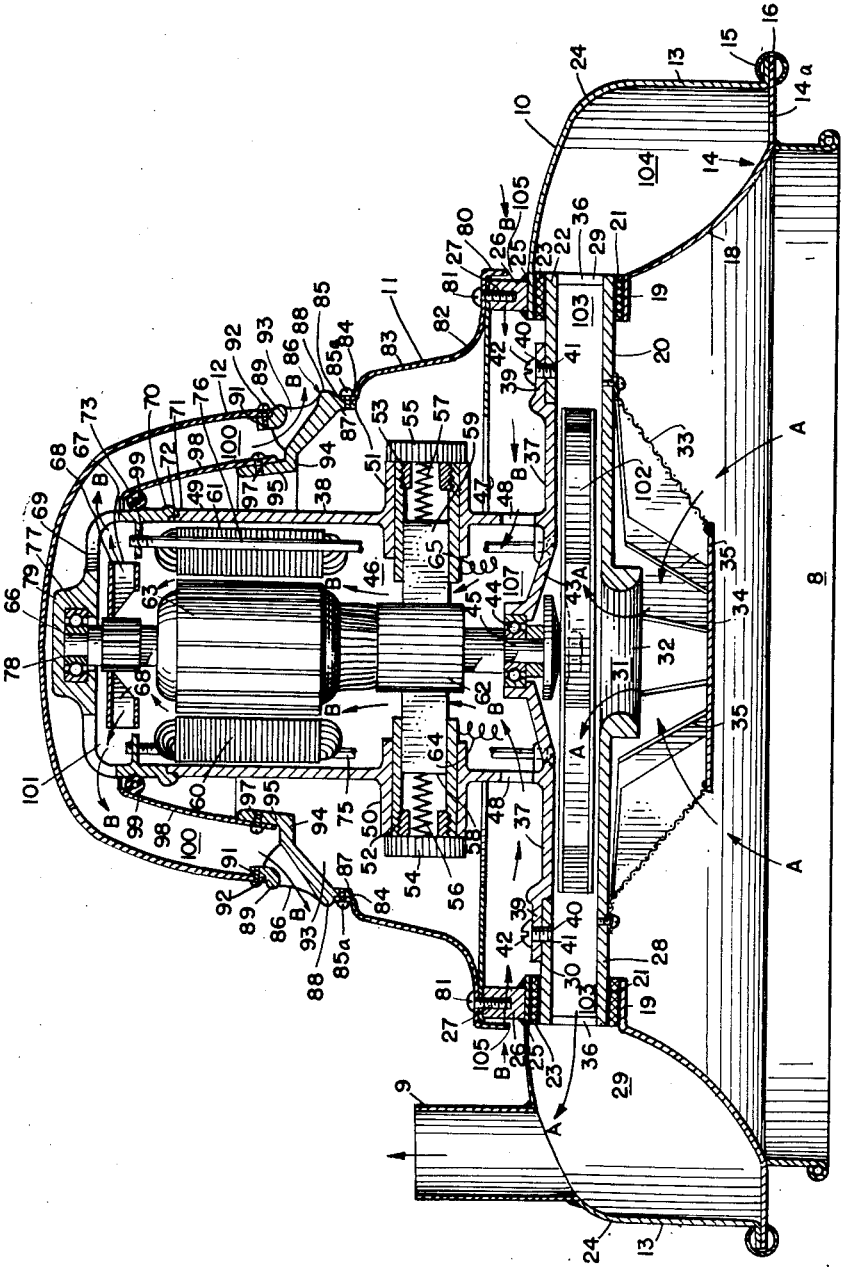
Fig. 3 is an enlarged vertical transverse sectional view taken along the plane of line 3—3 of Fig. 1.

In Fig. 3 two air circulatory systems are depicted by directional arrows. The one system indicated by means of letters A is the cleaning system created by the vacuum producing wheel 102 housed within the housing 22 and journaled upon the motor shaft end 45. This system is not involved in the present invention, but may be described briefly by stating that air is drawn from the interior 8 of the tank body through the screen 33 by the vacuum wheel 102 and passes into the interior 103 of housing 22, through the openings 36 in the rib of the housing into the annular passageway 104, and outwardly through the outlet 9.

System B is the motor cooling system, the air movement of which is created by fan wheel 67. The air enters the annular slot 105, passes between the spacer members 26, and enters the interior 107 of the motor housing via the air intake apertures 48 in the base 47 of the motor housing. The air is then drawn past the commutator 62 and upon and across the brushes 58 and 59 to perform its cooling function with respect to these elements. At this point the air is still cool and has not been heated by contact with the motor. The air continues its course upwardly past the brushes and commutator encountering the windings of the stators 60 and 61 and the rotor 63 to the fan wheel 67. The air is directed from the fan wheel through the openings 101 into the channel 100. After traveling the downward and outward course of channel 100 the air passes outwardly through the slots 93 formed in casting 86 where the cycle of air circulation terminates.

It is apparent that the first contact made by the air following the circulatory system B is with the commutator and the brushes so that the maximum cooling value of the air is directed upon the commutator and the brushes. Thus a greater degree of cooling is had by the circulation of air that has not encountered other portions of the motor in its circulatory cycle. The arrangement of the commutator and brushes upon the shaft end so as to permit the use of cooler air temperatures promotes the longevity of the motor life. Such arrangement also permits the cover to assume a frustro-conical shape in keeping with the requirements and dictates of modern design. In this manner a greater space is available in the vicinity of the brush holder portion of the motor housing permitting the use of larger brushes with the consequent advantage of the increased size of these elements.

Changes may be made in the form, construction and arrangement of parts from those disclosed herein without in anyway departing from the spirit of the invention or sacrificing any of the attendant advantages thereof, provided, however, that such changes fall within the scope of the claims appended hereto.

The invention is hereby claimed as follows:

1. A vacuum producing unit for application to a vacuum cleaner for the movement of air, comprising a motor, a shaft extending through said motor, a vacuum producing fan wheel mounted on one end of said shaft, a cooling fan wheel mounted on the other end of said shaft and having a diameter less than the diameter of said vacuum producing fan wheel, a housing around said motor, an annular end cap around said cooling fan wheel, a commutator and brush assembly on said shaft adjacent said vacuum producing fan wheel housing, air inlet openings through said motor housing at the end thereof adjacent said commutator and brush assembly, air outlet openings through said end cap adjacent said cooling fan wheel, whereby the cooling air will be drawn first into contact with said commutator and brush assembly before becoming heated by the motor windings, and an annular flange on said end cap extending inwardly therefrom and terminating closely adjacent the inner face of said cooling fan wheel, thereby to prevent recirculation of the cooling air.

2. A vacuum producing unit for application to a vacuum cleaner for the movement of air, comprising a motor, a shaft extending vertically through said motor, a cooling fan wheel mounted on said shaft at the upper end thereof, a rotor on said shaft and a stator therearound immediately below said cooling fan wheel, a commutator on said shaft immediately below said rotor, a housing around said motor having radially disposed guideways extending therethrough in alignment with said commutator, a brush assembly mounted in each of said guideways, a vacuum producing fan wheel mounted on the lower end of said shaft below said housing, an end cap on the upper end of said housing over said cooling fan wheel, air inlet openings through said housing at the lower end thereof adjacent said commutator and brush assembly, air outlet openings through said end cap, whereby the cooling air will be drawn first into contact with said commutator and brush assembly before becoming heated by the motor winding, and an annular flange on said end cap extending inwardly therefrom and terminating closely adjacent the lower edge of said cooling fan wheel, thereby to prevent recirculation of the cooling air.

References Cited in the file of this patent

UNITED STATES PATENTS

| | | |
|---|---|---|
| 1,044,287 | Sturges | Nov. 12, 1912 |
| 1,057,282 | Schaeffer | Mar. 25, 1913 |
| 1,822,859 | Perkins | Sept. 8, 1931 |
| 1,915,449 | Sacrey | June 27, 1933 |
| 1,995,630 | Bass | Mar. 26, 1935 |
| 2,082,713 | Melton | June 1, 1937 |
| 2,092,043 | Atwell | Sept. 7, 1937 |
| 2,099,172 | McCabe et al. | Nov. 16, 1937 |
| 2,540,178 | Smith | Feb. 6, 1951 |
| 2,658,665 | Tschudy | Nov. 10, 1953 |

FOREIGN PATENTS

| | | |
|---|---|---|
| 245,007 | Italy | Feb. 16, 1926 |